United States Patent [19]

Beckers et al.

[11] 4,135,055
[45] Jan. 16, 1979

[54] DEVICE FOR FIREPROOFING ELECTRIC CONDUCTORS

[75] Inventors: Richard Beckers, Dusseldorf; Wedigo V. Wedel, Cologne; Manfred Monheimius, Erkrath, all of Germany

[73] Assignee: Promat Gesellschaft fur moderne Werkstoffe mbH & Co. KG, Dusseldorf, Germany

[21] Appl. No.: 730,717

[22] Filed: Oct. 8, 1976

[30] Foreign Application Priority Data

Oct. 8, 1975 [DE] Fed. Rep. of Germany ... 7531903[U]
Nov. 6, 1975 [DE] Fed. Rep. of Germany ....... 2549810
Jun. 4, 1976 [DE] Fed. Rep. of Germany ....... 2625173

[51] Int. Cl.$^2$ .............................................. H02G 3/04
[52] U.S. Cl. .................................... 174/48; 169/48; 174/101
[58] Field of Search ................. 174/48, 49, 99 R, 101; 52/1, 232, 317, 39, 3; 169/48, 49; 220/88 R, 88 A; 217/45, 17

[56] References Cited

U.S. PATENT DOCUMENTS

| 771,301 | 10/1904 | Eddelman | 217/17 X |
|---|---|---|---|
| 1,217,398 | 2/1917 | Bonnell | 174/99 R |
| 2,023,433 | 12/1935 | McConnell | 174/101 X |
| 2,279,791 | 4/1942 | Lamb | 169/48 |
| 3,401,721 | 9/1968 | George | 174/101 X |
| 3,646,244 | 2/1972 | Cole | 174/48 X |

FOREIGN PATENT DOCUMENTS

| 2273561 | 2/1976 | France | 169/48 |
|---|---|---|---|
| 1298458 | 12/1972 | United Kingdom | 169/48 |

Primary Examiner—J. V. Truhe
Assistant Examiner—D. A. Tone
Attorney, Agent, or Firm—Meyer, Tilberry & Body

[57] ABSTRACT

A casing for enclosing and fireproofing electric conductors comprises of fire resistant side walls and having means for being supported by the conductor supports. In several embodiments, the casing has ventilation openings and heat responsive means for closing the openings.

24 Claims, 18 Drawing Figures

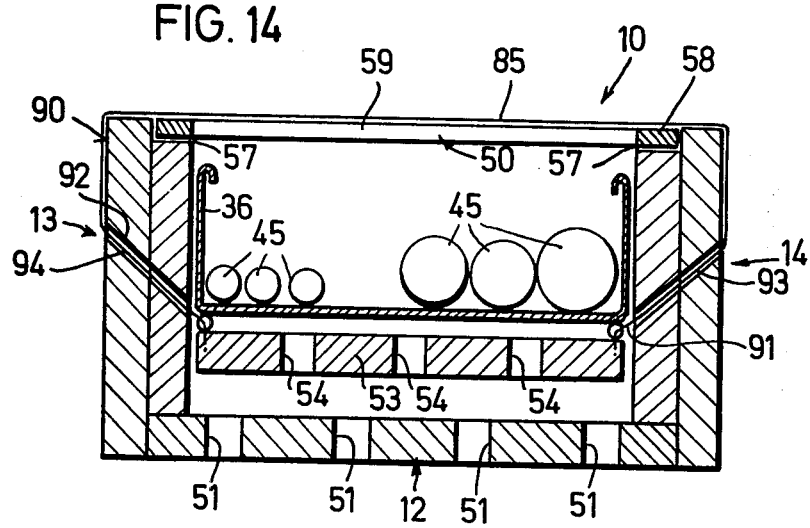
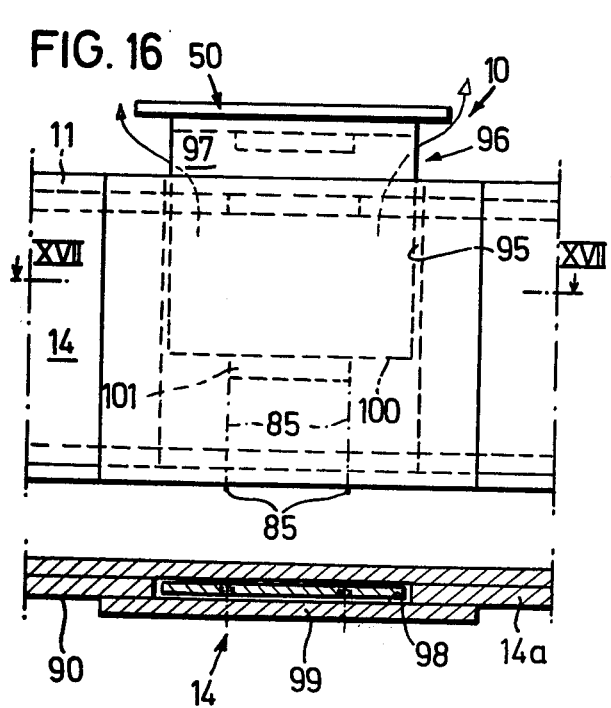
FIG. 14
FIG. 16
FIG. 15
FIG. 17

DEVICE FOR FIREPROOFING ELECTRIC CONDUCTORS

The invention relates to a device for fireproofing electric conductors, such as power, telecommunications or control cables which are laid in an exposed position in the room, on carrying means such as girders, platforms, tanks or the like.

In the case of exposed conductors, particularly in the case of electric cables sheathed with a coating of insulating material, which, grouped into a plurality of cables, are passed through a multiplicity of rooms, there is the risk that in the event of fire, the insulating sheathing on the conductors catches fire and of the fire being conveyed from one room to another. At the same time, as the cable sheaths which often consist of synthetic plastics material burns, corrosive and toxic gases are given off which constitute a serious hazard for people present in the vicinity of the fire. Furthermore, in the event of a fire involving electric conductors, short circuits are possible which can result in complete or partial failure of the power supply of the fire-stricken building, so that important supply services such as for example water pumps, lighting installations or the like, which are in fact urgently needed in the event of a fire, may fail.

The object of the invention is to provide an effective safeguard against fire for such conductors which are exposed in rooms, such fireproofing means guaranteeing perfect functioning of the conductors in normal use and in the event of fire and being adapted for simple and rapid fitment even to already installed conductors.

This problem is resolved according to the invention by a casing enclosing the support means and conductors and consisting of incombustible heat-insulating fire-resistant panels.

With such a casing, in the event of a fire, the conductors are kept away from the direct effect of the flames, so that the outer electrical insulating sheath of the cables is not destroyed, short circuits cannot occur and the fire is not conveyed to the conductors.

The casing can be provided with fixing means by which it can be attached to the ceiling or to the wall of the room through which the conductors pass. It is however also possible to mount the casing on the support means of the cable, which is in fact expedient in the case of an installation of the fireproofing device on already existing cable runs.

In the case of cable runs which extend in the vicinity of walls, it is advantageous for the casing to be at least partially supported by brackets mounted on a wall or the like and projecting laterally into the casing. In this case, the casing can be enclosed on all sides and have on at least one side wall apertures for attachment of the casing onto the brackets. Such a casing is easily produced and can be extremely easily and rapidly installed in that it is simply pushed onto the brackets sideways.

The apertures for the brackets may be located immediately below the upper inside face of the casing, so that the casing pushed onto the brackets has its upper inside face resting directly on the brackets. This ensures a satisfactory load distribution and vitually no further fixing means are required for the casing.

It is particularly expedient for one side wall of the casing to be at least partially removable or openable. This has the advantage that the fireproofing casing can be opened laterally over virtually its entire length for inspection of the cables contained within it, for insertion of further cables or for subsequent removal of individual lengths of cable.

In order to achieve a good stability of the fireproofing casing equipped wth a detachable side wall, the upper and lower sides of the casing may be connected on one side by insertable moulded strips to which the removable or openable side wall is attached. In this case, the edges on the open side of the box, which can be closed by the removable side wall or the upper side of the casing, can be protected by metal rails of angled, Z-, U- or h-section.

In the case of another embodiment, also the top side of the casing may be removable or openable, whereby then both side walls of the casing can be supported on the brackets which are then expediently screwed securely to at least one side wall of the casing.

It is particularly convenient for the brackets to be inserted through apertures located in one side wall of the casing, their inner ends being inserted into matching recesses in the opposite side waLL. In this case, only a few screws are required in order to prevent the cable conduit pushed onto the brackets slipping.

In the case of lateral attachments, the upper and lower sides of the casing may be expediently mounted on a wall of the room by strips, the oppositely disposed side of the casing having strips by which it is mounted on the free ends of the brackets. This provides a particularly simple and cost-saving construction since the brackets which support the cable trough or platform can at the same time serve as a means of supporting the fireproofing casing, which in this case only has to enclose the cable carrying means on three sides, since the fourth side is constituted by the wall of the building, on which the cable support means and fireproofing casing are mounted.

The top, bottom and side walls of the casing may expediently consist of in each case at least two panels of asbestos silicate having offset joints, the inner corner edges of the casing also being strengthened by angle-section bars. Such a construction guarantees particularly good fireproofing and a high mechanical strength of the casing which in this form of embodiment can carry numerous cables of considerable weight. The silicate additives to the cement-bonded asbestos fibre panels guarantee a high stability in the shape of the casing in the event of a fire.

Since in fact power conductors generate heat when in use, it is necessary to avoid heat building up inside the fireproofing casing during normal use. For this reason, the fireproofing casing according to the invention has at least on one of its peripheral walls apertures which close in the event of a fire. This has the advantage that in normal operation the heat developing at the conductors can easily be dispersed, since the casing is not tightly enclosed, but can have air passing through it. In the event of a fire, then, the casing automatically closes so that the fire gases cannot reach the conductors, ensuring that their insulating sheathing cannot catch fire.

The casing may be open at the top and provided with a gas and heat permeable covering. This covering may consist of a fine wire mesh, a wire netting or a wire grid, the wires of which are enclosed in a material which foams when subjected to heat. This covering is expediently removable so that the fireproofing casing is accessible from above over its entire length, allowing easy inspection of the conductors and providing an opportunity of installing further cables on the supporting means or of removing defective cables or cables which are no longer required. The heat from the conductors developing inside the fireproofing casing can easily be dispersed by the mesh. In the event of a fire, however, the flames cannot enter the casing so that the conductors themselves are not touched by the fire.

The wire gauze or the like can be stretched over frames which lie on projections disposed in the side walls of the casing. Such wire gauze frames can be made in portions of handy size which, laid one after another, cover the entire cable conduit and can be easily removed if it is necessary to add fresh cables or remove other cables.

The covering or the top panel of the casing can also consist of mineral fibre boards, preferably panels of asbestos silicate, the width of which is less than the inside width of the casing between the oppositely disposed rebated side walls. The covering can then rest on blocks made from a material which melts at high temperature and which are disposed at a distance from one another on the bottom faces of the rebates. This construction has the advantage that in normal operation the heat developed by the conductors can escape at the upper lateral edges of the fire-proofing casing, between the blocks, the fireproofing casing being closed at the top in the case of a fire, since then the great heat developed by the fire melts the blocks supporting the cover plate, which then lies flush in the bottoms of the rebates, so tightly closing the casing.

It is particularly expedient for also the bottom of the casing to have closable apertures. This improves the ventilation of the conductors enclosed by the fireproofing casing substantially, so reliably preventing a build-up of heat inside the fireproofing casing. In this respect, the bottom of the casing may advantageously be disposed at a distance below the supporting devices and have on its inside face closure plates which, in the same way as the coverings on the upper side of the casing, rest on spacers consisting of material which melts under heat and which leaves air passages free, the said air passages not being aligned with the apertures in the bottom of the casing.

This embodiment provides, under normal conditions, adequate ventilation of the conductors located inside the fireproofing casing. In the event of a fire, however, the apertures provided in the bottom are closed in that the spacers melt under the heat which is generated and the closure plates then lie flat on the bottom of the casing where they tightly close the apertures provided in the bottom.

The bottom of the casing may also consist of bottom frames having transverse ties and longitudinal ties, the longitudinal ties projecting inwards over the side walls of the casing and forming a support for the closure plates, the width of which is smaller than the inside width between the side walls of the casing. Such an embodiment is particularly simple and requires no special bores, slots or the like in the closure plates, since sufficient air for ventilating the cables can pass the long edges of the closure plates through the large apertures in the frame-like bottom and enter the interior of the fireproofing casing. There, the air flows around the conductors, passing out at the top of the fireproofing casing, through the gas and heat-permeable covering or pass the edges of the upper panel.

According to a further feature of the invention, it is possible to dispose in the side walls bores into which it is possible to insert wing nuts, fitting studs or the like, which project beyond the inside face of the side walls and which are supported on parts of the carrying means for the cables. This type of attachment of the fireproofing casing is particularly simple and permits of a very rapid assembly on the cable supporting means without requiring any alterations thereto or additional measures such as drilling, thread-packing or the like.

The side walls, the bottom panel or its frame and/or the upper panel of the casing may expediently consist of asbestos silicate panels. These asbestos silicate panels consisting predominantly of cement-bonded asbestos fibres with special silicate additives and which are marketed under the name "Promabest", when subjected to intense heat, give off crystal water so that water vapour develops which has a particular cooling effect and which also helps to prevent ignition of the insulating sheaths of the conductors in the case of a fire.

According to a further feature of the invention, the covering may consist of a fram made from asbestos silicate strips and having a plurality of closely adjacently disposed sheets comprising asbestos fibre panel strips enclosed in a material which foams when exposed to heat. Under normal use, then, the heat developed by the conductors can be dissipated. In the case of a fire, however, the sheathing of the plates foams up, so increasing their volume but the intermediate spaces between the plates are closed, so that the fireproofing casing is also closed at the top.

In the case of another form of embodiment, the bottom and at least one side wall of the casing have apertures disposed in the longitudinal direction and at intervals from one another, the said apertures being adapted to be closed by lowerable closure plates having vertical lateral flanges and disposed inside the casing. Such an embodiment is particularly suitable for those fireproofing casings which are mounted directly on the ceiling of a room. The heat developed by cables located inside the casing can then escape through apertures in the side walls of the casing, while cool room air can flow into the interior of the fireproofing casing from below, through the openings in the bottom. In the event of a fire, then, the vertical side flanges of the closure plates cause them to lower, sealing off both the bottom apertures and also the apertures in the side walls of the casing.

It is particularly simple to provide in the vertical side flanges of the closure plates apertures which, when the closure plate is raised, are aligned with the apertures in the side walls of the casing.

Similarly to the apertures in the bottom panel, it is also possible to provide in the upper panel of the casing and spaced at intervals, apertures which can be closed by lowerable coverings having vertical guide members which slide in vertical guide slots which are located in the side walls of the casing. This embodiment guarantees an exact guiding of in fact the upper covering or the lowr bottom parts of the casing, and of precise closure in the event of a fire.

The lowerable coverings and/or closure plates can be supported in their normal position of use ideally by supporting means which are destroyed by the action of heat. These supporting means provide support for the coverings or closure plates only until such time as the admissible maximum temperature in the room in which the cables are laid is not exceeded. As soon as the supporting means then melt away, the cover plates or closure plates assume the position in which they close off the ventilating apertures and orifices of the fireproofing casing.

The supporting means may be strips or threads of synthetic plastic which melt under the action of heat and which are fitted around at least one part of the outer periphery of the casing, their ends being secured to the covering. Such strips or threads are easily attached and require no additional fixing means. At normal temperatures they are of high strength but this strength is lost very rapidly in the case of a fire.

The covering can rest on incombustible strips, blocks or the like to which the ends of the traction means are attached. These strips or blocks, upon tearing or melting of the thread, are expediently adapted for free movement so that the end of a thread which may remain clinging to these strips or blocks cannot become jammed between the block and the side wall of the casing.

The closure plates or the covering may also be suspended on a plurality of traction means extended to the outside face of the casing and attached to the side walls thereof. In this respect, the ends of the traction means may pass through apertures in the side walls of the casing.

In the case of another form of emobdiment, it is possible to provide in the side walls of the casing and extending through the walls, cut-outs into which small bars of readily melting synthetic plastics material are inserted and which support the lowerable closure plate or the lowerable covering in its open position. These synthetic plastic rods may be made from nylon or some similar material and, when heat is applied, they start to melt so that they are sheared off against the side walls and allow the covering or the closure plate to fall freely downwardly so that it closes off the apertures in the casing. Hereby, the synthetic plastic rods may be inserted into bores in the vertical side or guide flanges but may also engage below the lowerable closure plate. In this respect, it is particularly expedient for the apertures disposed in the side walls to receive the small plastic rods to be substantially larger than the diameter of the rods located in them, so that in the event of a fire, the heat acting on them from outside can without hindrance attack the synthetic plastic pegs and cause them easily to melt.

The invention is explained in greater detail hereinafter with reference to examples of embodiment, shown in the attached drawings, in which:

FIG. 14 shows a further example of the embodiment of a fireproofing casing with a lowerable bottom covering, in cross-section;

FIG. 15 shows a different embodiment of the casing with a movable covering for the top, in a partial cross-section;

FIG. 16 is a side view of the object of FIG. 15, viewed in the direction of the arrow XVI;

FIG. 17 shows the object of FIG. 16 in a horizontal partial section taken on the line XVII—XVII in FIG. 16

Figure 1:
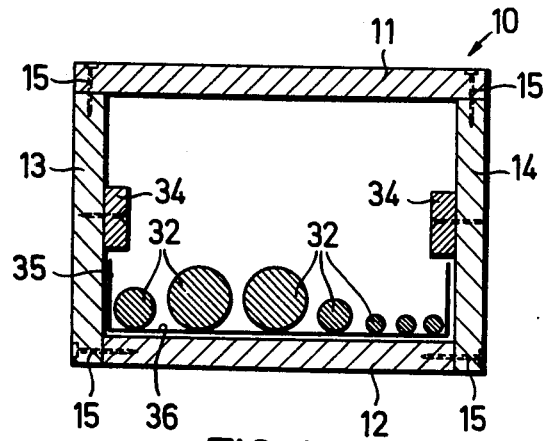
FIG. 1 shows a cross-section through a fireproofing casing according to the invention.

The drawings show at 10 a cross-sectionally rectangular casing for fireproofing telecommunications or control cables 32 and composed of a top panel 11, a bottom panel 12 and two oppositely disposed side walls 13 and 14. The panels 11 and 12 and the side walls 13 and 14 consist of asbestos sillicate panels which are connected to one another by clamps 15 to form the closed casing 10. The term "asbestos silicate panels" is intended to mean incombustible fire-resistant and relatively hard panels made from silicates using cement as a binder, and asbestos fibres and containing particular additives. When exposed to intense heat, such asbestos silicate panels give off crystal water which has a particular cooling effect. Such asbestos silicate panels are commercially available under the name "Promabest".

In the case of the example of embodiment shown in FIG. 1, there are secured on the inside face of the side walls 13 and 14 strips 34 made from asbestos silicate, by which the fireproofing casing 10 rests on the upper longitudinal edges 35 of a cross-sectionally U-shaped trough or cable platform 36, so that the fireproofing casing 10 is supported by the cable platform 36.

Figure 2:
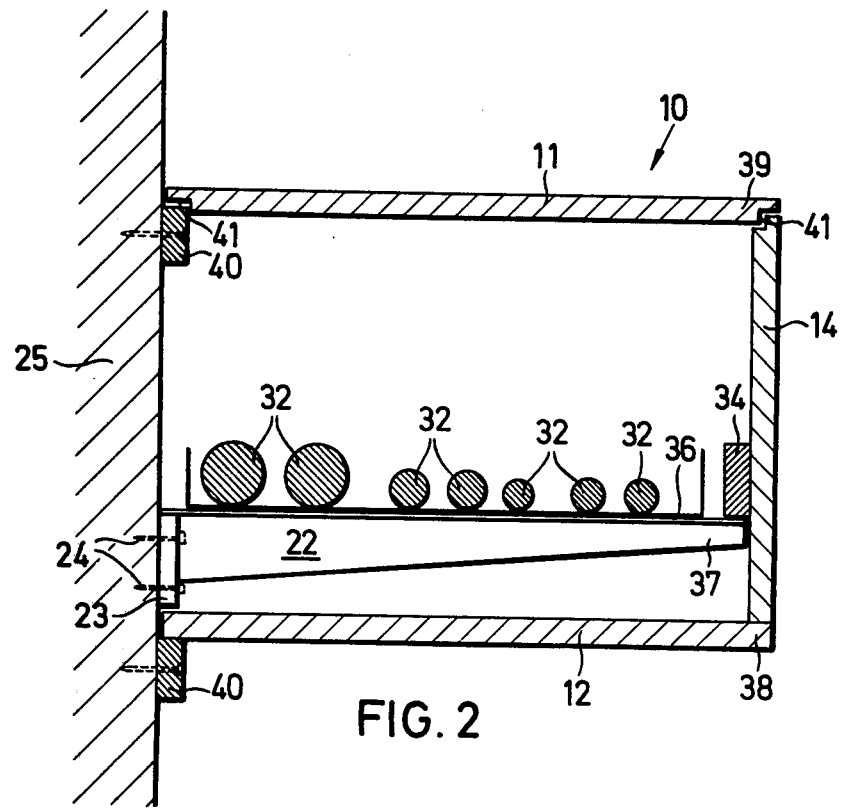
FIG. 2 shows a cross-section through another example of embodiment of the invention.

In the case of the example of embodiment shown in FIG. 2, the cable trough 36 with cables 32 rests on brackets 22 which are secured to the walls 25 of a building by means of a holding plate 23 with screws 24 or the like. The fireproofing casing 10 enclosing the support means 22 and 36 and the conductors 32 has only on the side opposite the wall 25 a side wall 14 having a strip 34 supported on the free ends 37 of the brackets 22. The side wall 14 is rigidly connected to the longitudinal edge 38 of the bottom panel 12 and carries at its top edge one longitudinal edge 39 of the upper panel 11. The upper panel 11 and lower panel 12 of the casing 10 are supported on the wall 25 of the building by noncombustible strips 40. These strips may be of asbestos silicate, but they may also be constituted by angled steel rails.

The top panel 11 of the casing 10 has rebates 41 by which it fits into the side of the casing 10 bounded by the side wall 14 and the wall 25 of the building, and it is detachable so that at any time the entire length of the fireproofing casing 10 is accessible so that individual cables 32 can be removed or inserted.

Figure 3:
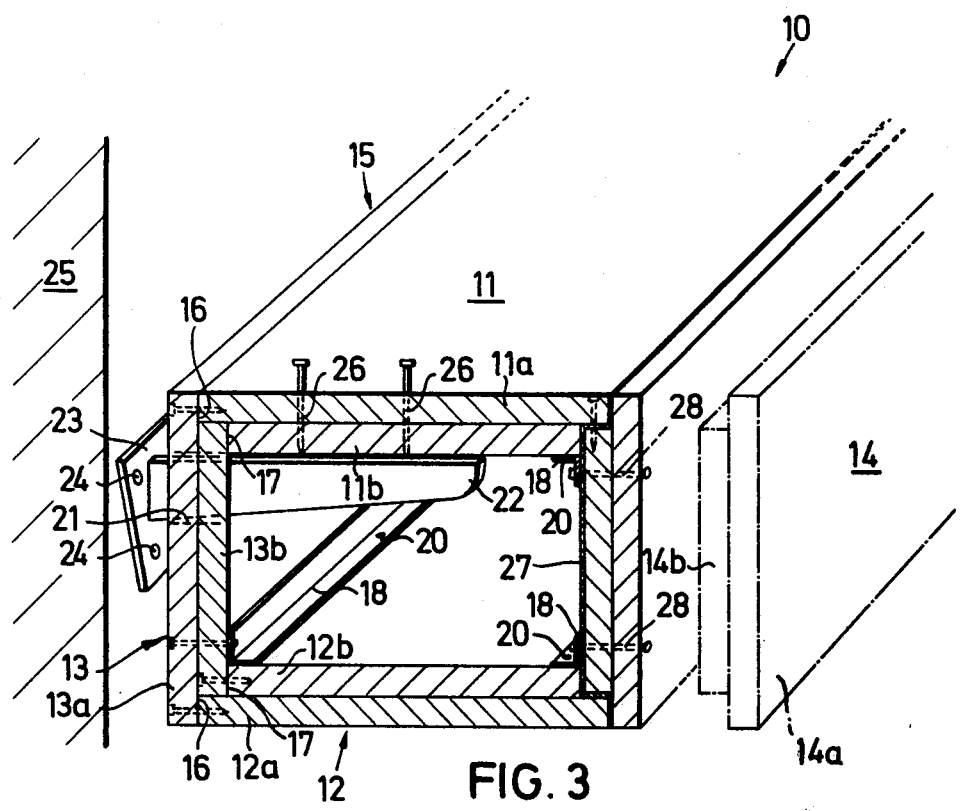
FIG. 3 is a perspective partially exploded view of a third example of embodiment of the invention.
Figure 4:
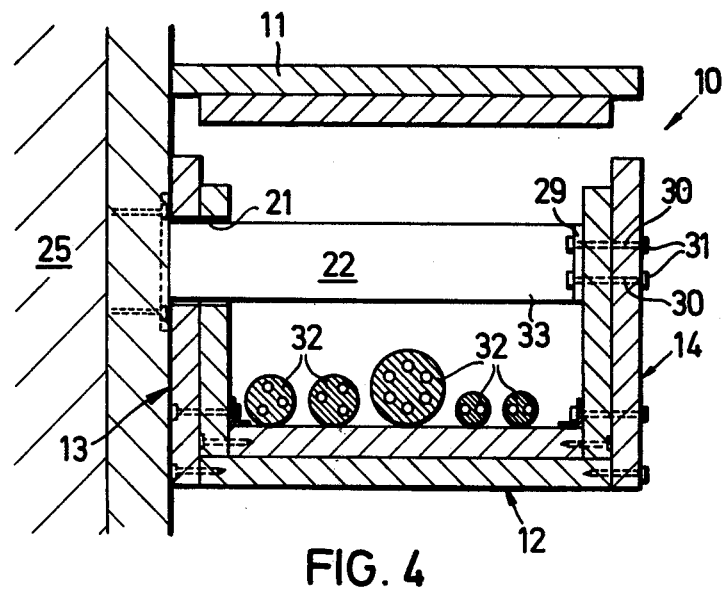
FIG. 4 shows a cross-section through a further example of embodiment of the invention.
Figure 5:
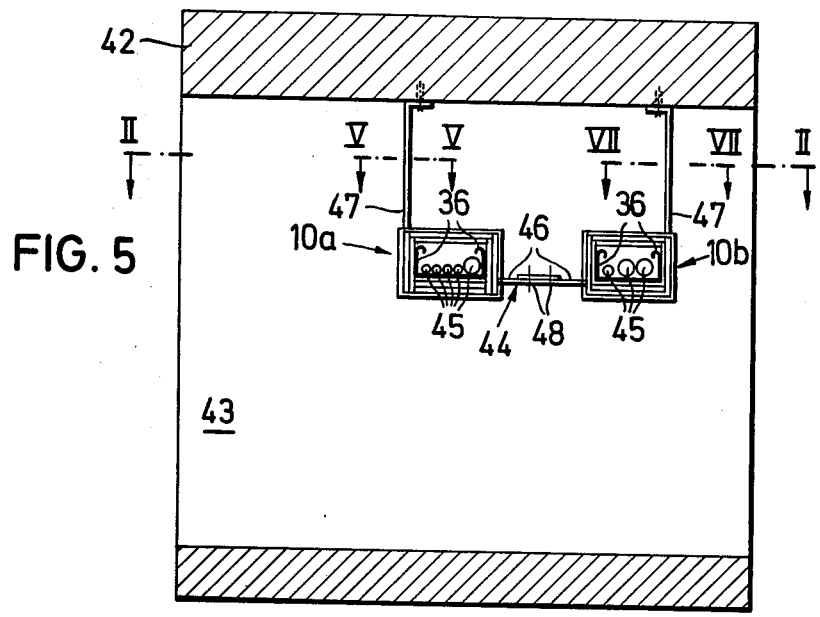
FIG. 5 shows two adjacently disposed cable platforms with two different embodiments of fireproofing casings, according to the invention, shown in vertical cross-section.
Figure 6:
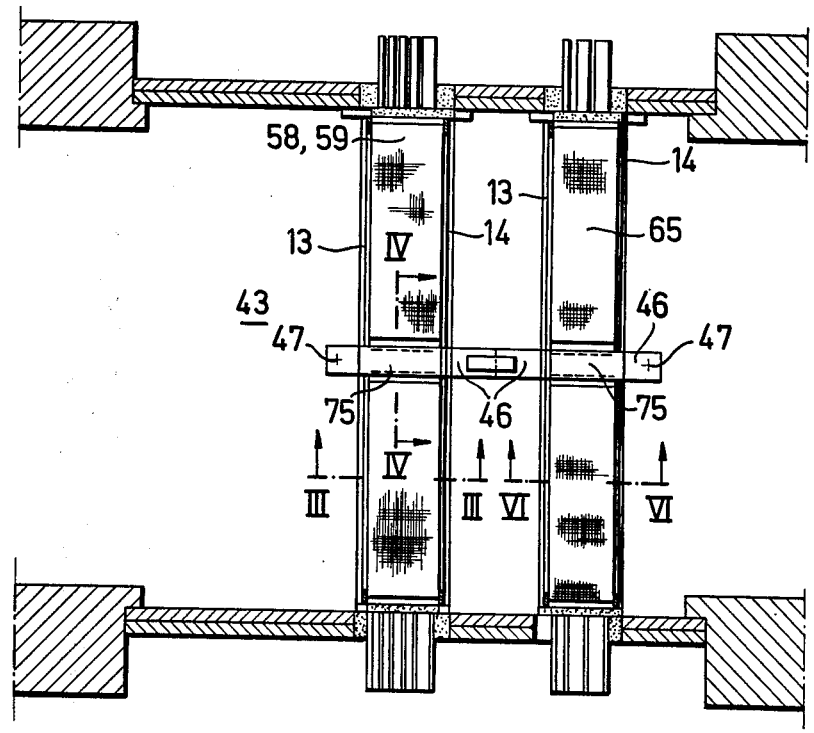
FIG. 6 shows the object of FIG. 5 in a plan view and partly in section taken along the line II—II in FIG. 5.

In the case of the examples of embodiment shown in FIGS. 3 and 4, the panels 11 and 12 and the side walls 13 and 14 in each case consist of two panels 11a, 11b; 12a, 12b; 13a, 13b and 14a, 14b of asbestos silicate which are so combined to form the rectangular casing 10 that the joints 16 and 17 of the panels of top, bottom and side walls, which abut at the inner corner edges 18, are offset in respect of one another. The inner corner edges 18 of the casing 10 are reinforced by angular profile rails 20 made from steel or aluminium.

In one side wall 13 of the casing 10 shown in FIGS. 3 and 4, there are disposed at intervals from one another a series of apertures 21 through which are inserted brackets 22 which project into the interior of the casing 10 and which are secured by a support plate 23 with screws 24 or the like in a wall 25 of a building. The apertures 21 for the brackets 22 correspond in their cross-section more or less to the form of the brackets 22 and are located immediately below the upper inside face 11 of the casing. The casing face 11 therefore lies directly on the brackets 22, of which only one is shown in FIG. 3.

The casing 10 is easily pushed sideways onto the brackets 22 which have been previously mounted on the wall 25 and can be secured to the brackets 22 by means of screws 26 or the like.

The side wall 14 opposite the side wall 13 which is next to the wall 25 is removable, so that the fireproofing casing 10 which in the present example also itself carries the cable 32, is accessible from the side so that cables can be subsequently added or removed. In order to ensure the stability of the casing 10 even when the side wall 14 is removed, the top panel 11 and the bottom panel 12 of the casing 10 are connected to each other on this side by metal insertable moulded strips 27 which are located in the longitudinal direction of the casing 10 and at a distance from each other, and on which the detachable or openable side wall 14 is secured by screws 28 or the like.

In the case of the example of embodiment shown in FIG. 4, the top panel 11 of the casing 10 is removable. The bracket 22 which here is likewise mounted on the wall 25 extends through an aperture 21 in one side wall 13 and is secured on the opposite side wall 13 by screws 30, by a flange plate 29 welded on the bracket 22. The screws 30 can pass through the side wall 14 and be provided there with nuts 31, although it is also possible to use wood screws and to screw these from the inside of the casing through into the side wall 14.

The cables 32 located inside the casing 10 can be pushed under the brackets 22 in a longitudinal direction.

Instead of mounting the bracket 22 with screws 30 on the side wall 14, it is possible to provide in this side wall a cut-out, not shown in greater detail, into which the inner end 33 of the bracket 22 can be exactly fitted, and in which the side wall 14 is supported on the bracket 22.

While the casing 10 shown in FIGS. 1 to 4 are intended for fireproofing weak-current cables, for example for telecommunications cables, control cables, bell wires and the like, which during operation generate no or only very minimal heat, the devices shown in FIGS. 5 to 18 are used first and foremost for fireproofing power cables and other conductors which generate heat. In order to dissipate this heat from the cables, which is developed under normal operation, the fireproofing casings described hereinafter are provided with apertures which are closed in the event of a fire.

Figure 7:
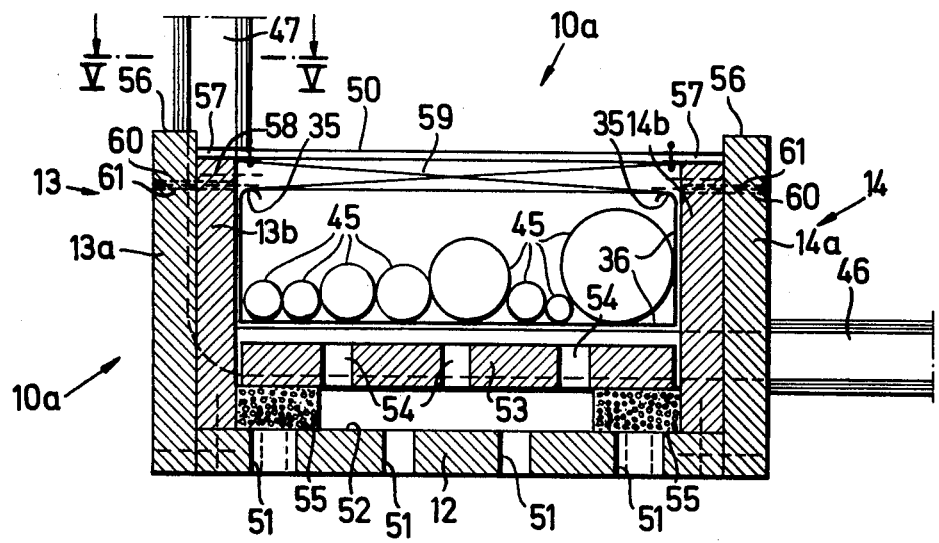
FIG. 7 shows the embodiment of fireproofing means according to the invention as illustrated on the lefthand side of FIG. 5, but on an enlarged scale.
Figure 8:
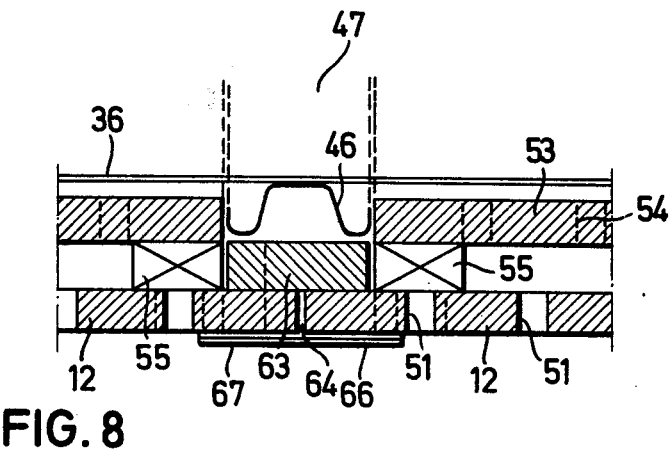
FIG. 8 shows the object of FIG. 6 in a partial longitudinal section taken on the line IV—IV in FIG. 6.
Figure 9:
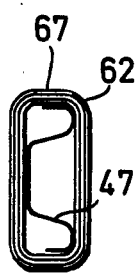
FIG. 9 shows the object of FIG. 7 in a horizontal partial section on the line V—V of FIGS. 5 and 7.
Figure 10:
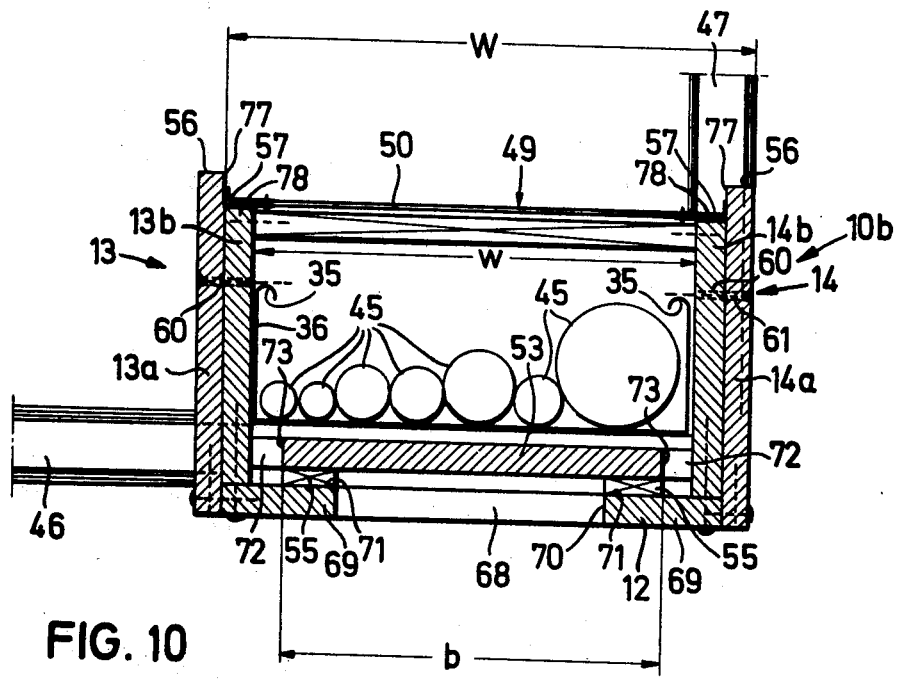
FIG. 10 shows the embodiment of the invention illustrated on the right in FIG. 5, on an enlarged scale and in a cross-section corresponding to FIG. 7.
Figure 11:
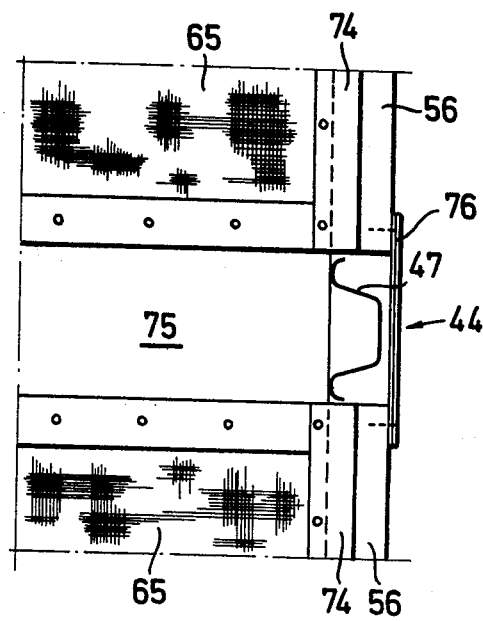
FIG. 11 is a partial plan view of the fireproofing casing according to FIG. 10 in a horizontal partial section taken on the line VII—VII of FIG. 5; on an enlarged scale.

In the case of the examples of embodiment shown in FIGS. 5 to 11, there is mounted on the ceiling 42 of a cellar 43 or the like a carrying device 44 for electric conductors, for example for power cables 45 with suspension rails 47. The support device 44 consists of, disposed at a distance from each other, two U-shaped troughs or cable platforms 36, the top longitudinal edges 35 of which are bent over inwardly. The troughs 36 which do not have to extend over the entire length of the room but which can also be disposed longitudinally at a distance from each other, lie on cross-members 46 which are in one place with the suspension rails 47, being connected to each other in the centre by two screws 48. Suspension rails 47 and cross-members 47 may also be individual parts. They consist of metal strips having a hat-shaped cross-section (FIGS. 9 and 11).

In the event of a fire, in order to protect the cables 45 from fire, there is according to the invention, for each of the two cable runs, a casing 10a, 10b consisting of incombustible heat-insulating fire-resistant panels 13a, 13b; 14a, 12a and 12b enclosing the support device 44 and the conductors 45 resting on it. The casings 10a and 10b are open at the top 49 and are provided with a removable gas and heat-permeable covering 50. The panels 12a, 12b; 13a, 13b; 14a, 14b again consist preferably of asbestos silicate, i.e. cement-bonded asbestos fibre materials with silicate admixtures which, when exposed to intense heat, give off crystal water which develop water vapour in the great heat.

In the case of the fireproofing casing shown in FIGS. 7 and 8, the screwed or glued-together panels 13a and 13b form one side wall 13 and the panels 14a and 14b form the other side wall 14. Attached to the bottom edges of the side walls 13 and 14 is the bottom panel 12 of the casing in which there are a plurality of holes 51 distributed over the bottom. The bottom 12 of the casing 10a is located at a distance below the cross-members 46 with the troughs 36 and carries on its inside face 52 closure panels 53 of asbestos silicate provided with a number of air ducts 54 which are not aligned with the holes 51 in the bottom 12. The closure panels 53 lie on spacers 55 constituted by blocks of foaming synthetic plastics material which melts under heat.

Along their upper edges 56, the side walls 13 and 14 have continuous rebates 57 in which lies the covering 50 of the fireproofing casing 10a. The covering 50 in the case of the examples shown in FIGS. 7 and 8 consists of a plurality of frames 58 of asbestos silicate strip having a plurality of closely adjacently disposed sheets 59 made up from asbestos fibre panel strips, disposed at right-angles to the conductors 45. These sheets 59 which are at only a relatively short distance from one another, are covered with a material which foams up when subjected to heat, to close the intermediate spaces between the plates in the event of a fire. Such materials which foam under heat are known and are commercially available under the name "foam forming coatings".

Disposed in the upper part of the side walls 13 and 14 are bores 60 into which are fitted wing nuts or studs 61 which protrude beyond the inside face of the side walls 13 and 14, being braced on the upper bent-over edges 35 of the troughs 36 of the cable support means 44.

In order to secure the fireproofing casing 10a according to the invention on the support means 44, it is necessary only to push it over the support means 44 from below and to insert the studs 61. The protective casing 10a then is suspended from the trough 36 and is carried by the suspension rails 47 of the support means 44. Afterwards, the cables 45 can be laid into the troughs 36 and the cover 50 placed into the rebate 57 around the edge of the fireproof casing 10a.

During normal operation, air can pass through the holes 51 in the bottom 12 and through the air ducts 54 in the closure plates 53 arriving at the conductors 45, along which the air flows emerging at the top between the sheets 59 of the covering 50. The cables in the ducts are in this way constantly ventilated and the heat generated is dissipated upwardly and continuously under normal conditions of operation. In the event of a fire, however, during which high temperatures occur outside the cable conduits in the room 43, the blocks 55 of Styropor or some other material which melts under heat, melts very rapidly causing the closure plate 53 to drop onto the bottom plate 12, closing off the holes 51 in the bottom plate 12, while at the same time the air ducts 54 in the closure plate 53 are closed by the bottom panel 12. At the same time, the covering on the sheets 59 foams up, thereby closing the slots and intermediate spaces between the sheets 59 of the covering 50.

As a fireproof covering for the suspension rails 47 and those parts of the cross-members 46 located outside the casing 10a and 10b, the fireproof covering 62 is provided which consists of a wire mesh, grid or gauze, the wires of which are enclosed in a material which stands up under heat. This material occupies little space, is readily flexible and can at minimum cost be wound around all those parts which consist of metal or other materials and which have to be protected requiring effective fireproofing, but which lie in areas of difficult access, where little additional space is available for covering purposes.

As FIG. 8 shows, the closure plates 53 are discontinuous in the region of the cross-members 46. Below the cross-members 46, there then lies a transverse strip 63 of asbestos silicate which at the same time covers the joint 64 between longitudinally adjacent bottom panels 12 and which may on its underside be additionally covered by a strip of wire gauze 66 with a coating 67 of a material which foams up under heat.

In the case of the further example of embodiment of the invention shown in FIGS. 10 and 11, the bottom panel 12 consists of a bottom face with transverse ties 68 and longitudinal ties 69 disposed at intervals from one another, so that the bottom panel 12 itself incorporates very large apertures 70. The longitudinal ties 69 project inwardly beyond the side walls 13 and 14 and form a supporting rim 71. There are no apertures in the closure plate 53, but its width b is less than the inside width w between the side walls 13 and 14 of the casing 10b. The closure plate 53 rests on blocks or spacers 55 made from Styropor or some other material which melts under heat and disposed at intervals from one another in the longitudial direction.

It will be evident that under normal conditions air can pass through the apertures 70 from below and between the blocks 55, through the lateral marginal openings 73 between the side walls 13 and 14 on the one hand and the outer edges 73 of the closure plate 53 on the other, into the interior of the casing 10b and pass around the cables 45. It then emerges through the covering 50 at the top 49 of the casing.

In the case of the example of embodiments shown in FIGS. 10 and 11, the covering 50 consists of several metal frames 74 which are placed in rebates 57 on the upper edges 56 of the side walls 13 and 14 and covered with a wire gauze, net or grid 65 which may be covered with a non-combustible material which foams up under the action of heat. This coating material may expediently be applied by the gauze or gauze frame being dipped into a bath containing the foaming material.

In the region of the support means 44, there is provided as a covering an asbestos silicate strip 75 against which abut the frames 74 which are covered with wire gauze 65 and beside which the suspension rails 47 project from the casing 10b and which, as shown in FIG. 9, are enclosed with a wire gauze outside of the casing 10b. In the region of the fireproof casing 10b, the abutment point is covered with a piece of wire gauze 76 which, like the wire gauze of the covering 50, is coated with a material which foams under heat.

According to a further example of embodiment, not shown in greater detail in the drawings, it is also possible to provide as a covering 50 a panel of asbestis silicate, the width of which is less than the inside width W of the casing 10b between the mutually facing rebate of side walls 77. In the same way as the closure plate 53, the covering 50 then rests on blocks which melt at high temperature and which are disposed at intervals from one another on the bottoms of the rebates 78. The heat developing inside the fireproof casing 10b can then emerge at the sides, by the rebates, between the blocks which rest on the bottoms of the rebates. In the event of fire, the blocks melt and the covering lies tightly on the bottoms of the rebates, so that the casing is also tightly sealed at the top, while the closure plate 53, upon melting of the blocks 55, rests on the top of the bottom frame sealing off the apertures 70 therein.

Like the casing 10a, the fireproof casing 10b is mounted and suspended on the support means 44. For this purpose, it likewise has studs 61 which are inserted through corresponding apertures 60 into the side walls 13 and 14.

It will be evident that it is possible to adapt the fireproof casings also to other types of cable support means. Instead of apertures and holes in the bottom panels and closure panels, it is possible also to provide slots or differently formed cut-outs. Furthermore, it is possible for the wire gauze or grid provided with a coating which foams under heat to be used for the fireproof enclosure of other components.

Figure 12:
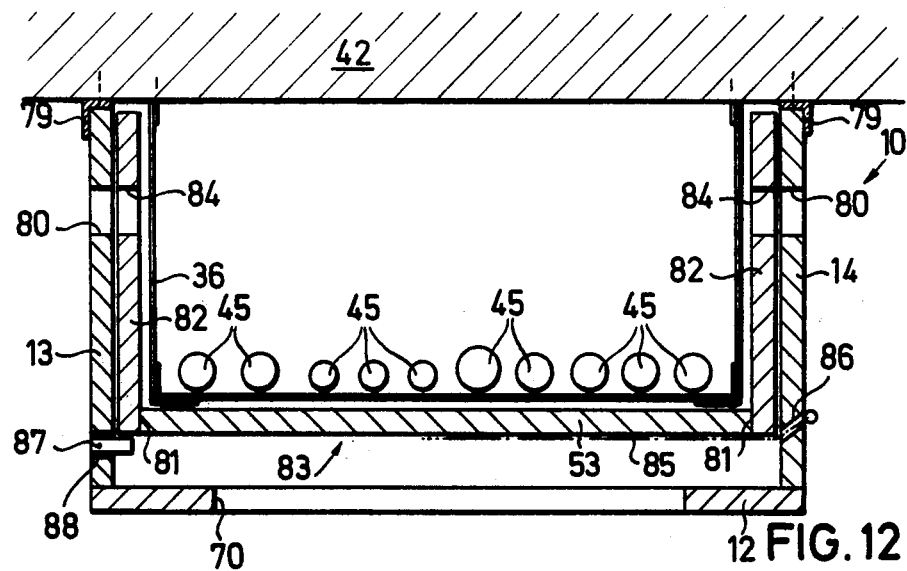
FIG. 12 shows a further example of embodiment of the fireproofing casing according to the invention, in cross-section.
Figure 13:
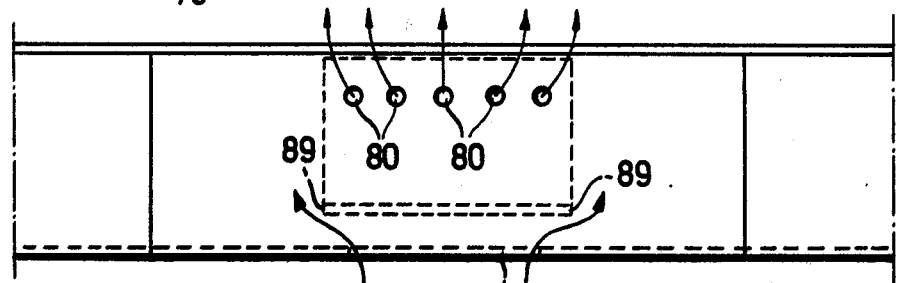
FIG. 13 shows the object of FIG. 12 in a lateral view and on a smaller scale.

In the case of the example of embodiments shown in FIGS. 12 and 13, the fireproof casing consists only of the bottom panel 12 and the side walls 13 and 14 which are attached to the ceiling 42 of a room by angled profiled strips 79. Here, the fireproof casing 10 encloses the cable platform 36 at a small distance, this being in turn mounted on a ceiling 42 of the room and carrying the conductors 45. The bottom panel 12 of the fireproof casing 10 has, disposed at intervals from one another in the longitudinal direction, a plurality of apertures 70 through which the air can penetrate from below and into the fireproof casing 10. Furthermore, there are in the side walls 13 and 14 of the casing 10 apertures 80 of which, in the case of the examples illustrated, several are grouped together into one set disposed more or less in the region of the bottom aperture 70 in the bottom panel 12. Also these apertures 80 in the side walls 13 and 14 are disposed at more or less equal distances from one another as are the apertures in the bottom of the casing.

In the region of the apertures 70 and 80, there is inside the casing 10 a lowerable closure plate 53 having vertical side flanges 82 mounted on its longitudinal edges 81 and which, together with the closure plate 53, form a cross-sectionally U-shaped closure member 83. Provided in the lateral flanges 82 are apertures 84 which are aligned with the apertures 80 in the side walls 13 and 14 of the casing when the closure member 83 is in its raised position shown in FIG. 12. In this position, the closure member is either held by nylon threads 85 which are stretched under the closure plate 53 of the closure member 83, pulled through apertures 86 in the side walls 13 and 14 and anchored on the outside of the casing 10 (see righthand half of FIG. 12) or it is supported by studs or small rods 87 made from readily melting synthetic plastics material which are inserted into through-bores 88 in the side walls 13 and 14 engaging below the closure member 83 (see lefthand half of FIG. 12).

It will be seen from FIG. 13 that under normal conditions of use the air can pass from below through the aperture 70, over the end edges 89 of the closure members 83 and into the casing, then emerging again through the cut-outs 84 and apertures 80 in the side walls 13 and 14, carrying away the heat developing thereby in the inside of the casing. In the event of a fire, the nylon threads 85 or the plastic studs 87 melt and the closure member 83 or a plurality thereof fall onto the bottom 12 of the casing 10, the closure plate 53 sealing off the opening 70 in the bottom 12 and the side plates 82 closing off the apertures 80 in the side walls 13 and 14 of the casing, while at the same time the apertures 84 in the side plates 82 are closed by the side walls 13 and 14 of the casing 10.

In the case of the example of embodiment shown in FIG. 14, the fireproof casing corresponds substantially to the casing shown in FIG. 7. Here, however, the closure plate 53 is not supported on meltable blocks but is carried by a traction means, for example a nylon thread 85, which can be destroyed by the action of heat and which is passed over the top of the fireproof casing 10, around the outside face 90 thereof, and the two ends 91 and 92 of which are passed through obliquely downwardly extending apertures 93 and 94 in the side walls 13 and 14 of the casing 10, being expediently attached to the top of the closure plate 53. In the event of a fire in the room in which the fireproof casing 10 is located, the nylon thread 85 melts on the outside 90 of the fireproof casing 10 and the closure plate 53 drops onto the bottom plate 12, thereby closing the holes 51 while at the same time the air ducts 54 in the closure plate 53 are sealed by the bottom plate 12.

In the case of the example of embodiment shown in FIGS. 15 to 17, the top panel 11 of the fireproof casing 10 has disposed at intervals from one another in the longitudinal direction, a number of apertures 95 carried by cover plates 50 made from asbestos silicate. These cover plates 50 are mounted on a U-shaped frame 96 made of asbestos silicate panels having two downwardly directed vertical guide flanges 97 which slide in vertical guide slots 98 located in the side walls 13 and 14 of the fireproof casing 10. Since FIG. 15 shows only half the casing, then here under the righthand side wall 14 is illustrated.

The guide slots 98 are expediently formed by recesses in the outer panels 14a, 13a of the side walls 14, 13, which are then closed on the outside by additional slot cover plates 99.

As FIG. 15 shows, there are below the bottom edge 100 of the vertical guide plate 97 freely movable blocks or strips 101 consisting of asbestos silicate strips, on which the free ends of a nylon thread 85 are secured, the thread being looped over the outside 90 of the casing 10, around the underside thereof and passing through apertures 93, 94 on the slot cover plates 99 of the side walls 14.

It will be seen from FIG. 15 that the nylon thread 85 attached to the blocks 101 is so short that the blocks 101 are maintained at a considerable distance from the bottom 12 of the casing 10, so that the cover plate 50 supported by the U-shaped frame 96 is at a distance from the bottom 11 of the casing and heat developing inside the casing can escape through the aperture 95 below the covering 50 through the top panel 11 of the casing 10, escaping to the front and rear. In the event of a fire, the nylon thread 85 passed around the outside 90 of the casing 10 melts. The blocks 101 then move their supporting function and drop downwards in the guide slots 98. As a result, also the U-shaped frame 96 with its guide plates 97 in the guide slots 98 slides downwards and the cover plate 50 seals the opening 95 in the top 11 of the casing 10.

Instead of individual continuous nylon threads 85 passed around the outside of the casing 10, the free ends being secured to the covering, the covering may also be suspended from a plurality of traction means passed to the outside of the casing and attached to the side walls thereof, for example to hooks, eyes or the like.

Figure 18:
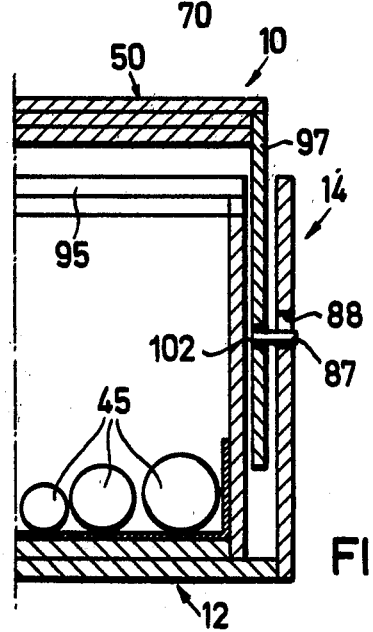
FIG. 18 is a partial cross-section through a somewhat modified embodiment of the casing shown in FIG. 15.

In the case of the example of embodiment shown in FIG. 18, there are in the vertical guide plates 97 of the covering 50 bores 102 into which cylindrical rods or studs 87 of nylon or some other easily melting synthetic plastics material are inserted, being located in substantially larger recesses 88 in the side walls 13 and 14 of the casing 10. The recesses 88 are located sufficiently high above the bottom 12 of the casing that they maintain the covering 50 sufficiently high above the opening 95 in the top 11 of the casing 10. In the event of a fire, the rods or studs 87 melt in the cut-outs 88, shear off and allow the covering 50 with its guide plate 97 to slide freely downwardly so that the aperture 95 in the top 11 of the casing 10 is closed.

In the same way, it is also possible to provide in the sides of a lower covering or closure plate small rods which pass through sufficiently large cut-outs in the side walls, as shown in FIGS. 12 and 13.

Supporting the covering 50 by means of nylon rods 87 instead of nylon threads has the advantage that during installation or during normal operation of the plant, the suspension is less easily destroyed so that a greater degree of functional reliability is guaranteed in the event of a fire.

For the traction means, it is also possible to use other materials, for example organic fibre materials which burn under heat and which in this way release the parts which they are supporting.

Having thus described the invention, it is claimed that:

1. A device for fireproofing electric conductors, comprising a casing enclosing the conductors, said casing including non-combustible fire-resistant wall panels, at least one of said wall panels including apertures, and means for closing the apertures in said one wall panel in the event of a fire.

2. A device according to claim 1, wherein said wall panels include sidewall panels, the casing is open at the top, and a gas and heat-permeable covering is provided for the opening.

3. A device according to claim 2, wherein said covering consists of a fine-mesh wire net, the wires of which are covered with a material which foams up under heat.

4. A device according to claim 3, wherein the wire net is stretched over frames which lie on projections disposed on the side walls of the casing.

5. A device according to claim 2, wherein the side walls have rebates and the coverings lie in the rebates.

6. A device according to claim 2, wherein the sidewalls have rebates and the covering consists of mineral fiber panel of a width smaller than the inside width of the casing between the oppositely disposed rebated sidewalls and blocks made from a material which melts at high temperature are disposed at intervals from one another, on the bottoms of the rebates, said covering resting on said blocks.

7. A device according to claim 2, wherein said covering consists of a frame of asbestos silicate strips having a multiplicity of closely adjacently disposed sheets of asbestos fiber panel strips enclosed in a material which foams when exposed to heat.

8. A device according to claim 1, wherein said means for closing the apertures in said one wall includes a closure plate on the inside of said casing and spaced from said one wall, and spacers made from material which melts under heat holding said closure plate spaced from said one wall, said closure plate having air passages which are not aligned with the apertures in said one wall.

9. A device according to claim 1, wherein said wall panels include sidewall and bottom wall panels, the bottom wall of the casing is said one wall and consists of frames having cross-ties and longitudinal ties providing said apertures, said means for closing said apertures including closure plates, and the longitudinal ties projecting inwardly beyond the sidewalls of the casing and forming a support for said closure plates, the width of which closure plates is less than the inside width between the sidewalls of the casing.

10. A device according to claim 1, wherein said wall panels include side wall panels, the sidewalls of said casing have bores receiving casing support means which project beyond the inside face of the sidewalls.

11. A device according to claim 1, wherein said wall panels include sidewall and bottom wall panels, and wherein at least one of the side walls and bottom wall of the casing consists of asbestos silicate panels.

12. A device according to claim 1, wherein said wall panels include sidewall and bottom wall panels, the bottom and at least one sidewall of the casing have apertures disposed at intervals from one another in the longitudinal direction, and lowerable closure members including vertical side plates disposed inside the casing for closing said apertures.

13. A device according to claim 12, wherein the vertical side plates have apertures which, when the member is in the raised position are aligned with the sidewall apertures.

14. A device according to claim 1, wherein said wall panels include sidewall and top wall panels, said top wall panel being said one wal panel, and said means for closing said apertures comprises a member having vertical guide plates which slide in vertical guide slots disposed in the sidewalls of the casing.

15. A device for fireproofing heat developing conductors, comprised of a casing enclosing the conductors and consisting of non-combustible fireresistant panels having apertures therein and a closure member for said apertures spaced from the panels by support means, said support means being destroyed by the action of heat.

16. A device according to claim 15, wherein the support means is an elongated member of synthetic plastics material which melts under the action of heat and which passes around at least part of the outer periphery of the casing, the ends of said elongated member being secured to the closure member.

17. A device according to claim 15, wherein the support means is a elongated member of a material which is destroyed by the action of heat, said elongated member passing around the underside of the closure member and attached to said panels.

18. A device according to claim 15, wherein said support means includes incombustible members and traction means which can be destroyed by the action of heat attached to said incombustible members, said closure member resting on said incombustible members.

19. A device according to claim 15, wherein said casing includes sidewalls and said support means includes a plurality of traction means, said traction means leading to the outer face of the casing and being attached to the sidewalls thereof, and said closure member being supported in suspension by said traction means.

20. A device according to one of claim 19, wherein the ends of the traction means pass through apertures in the side walls of the casing.

21. A device according to claim 15, wherein the casing includes sidewalls having through-holes, said support means being rods of easily melting synthetic plastics material in said holes and projecting into said casing, said rods holding the closure member in its open position.

22. A device accordng to claim 21, wherein said synthetic plastic rods extend below the closure member for the closure member to rest thereon.

23. A device according to claim 21, wherein the holes located in the sidewalls for the synthetic plastic rods are substantially larger than the diameter of the rods located in them, said rods having ends in said casing attached to said closure member.

24. A device according to claim 12, wherein said synthetic plastic rods extend into bores in the vertical plates.

* * * * *